United States Patent [19]

Sakakiyama

[11] 4,449,619

[45] May 22, 1984

[54] SYSTEM FOR CONTROLLING AN ELECTROMAGNETIC CLUTCH FOR AUTOMOBILES

[75] Inventor: Ryuzo Sakakiyama, Tokyo, Japan

[73] Assignee: Fuji Jukogyo Kabushiki Kaisha, Tokyo, Japan

[21] Appl. No.: 305,420

[22] Filed: Sep. 25, 1981

[30] Foreign Application Priority Data

Sep. 30, 1980 [JP] Japan ............................... 55-137221

[51] Int. Cl.³ ...................... F16D 27/16; B60K 41/28
[52] U.S. Cl. .............................. 192/0.052; 192/0.092; 192/3.56; 192/3.58; 192/21.5
[58] Field of Search .................... 192/3.56, 3.58, 21.5, 192/0.08, 84 A, 103 R, 0.075, 0.076, 0.052

[56] References Cited

U.S. PATENT DOCUMENTS

| | | | |
|---|---|---|---|
| 2,688,388 | 9/1954 | Gill | 192/21.5 |
| 2,821,868 | 2/1958 | Gregory | 74/701 |
| 3,730,317 | 5/1973 | Jaeschke | 192/84 A |
| 3,752,284 | 8/1973 | Brittain | 192/0.052 |
| 4,086,994 | 5/1978 | Hirosawa et al. | 192/109 F |

FOREIGN PATENT DOCUMENTS

| | | |
|---|---|---|
| 809490 | 2/1959 | United Kingdom . |
| 860545 | 2/1961 | United Kingdom . |
| 955602 | 4/1964 | United Kingdom . |
| 993632 | 6/1965 | United Kingdom . |

*Primary Examiner*—George H. Krizmanich
*Assistant Examiner*—M. Manley
*Attorney, Agent, or Firm*—Martin A. Farber

[57] ABSTRACT

A system for controlling an electromagnetic clutch of an internal combustion engine mounted on a vehicle, which is capable of eliminating the residual magnetism during operation of a shift lever of a transmission. The electromagnetic clutch has a drive member secured to a crankshaft of the internal combustion engine, a driven member adjacent the drive member, and a magnetizing coil provided in one of the members. A neutral switch is provided for detecting when the shift lever is in a neutral position and a switch for detecting acceleration is provided for producing a signal when the engine is not accelerated. Both signals of the switches are fed to a control circuit. The control circuit is so arranged that the current flowing through the magnetizing coil is inverted in dependency on the output signals, so that the residual magnetism in the clutch may be eliminated.

13 Claims, 5 Drawing Figures

SYSTEM FOR CONTROLLING AN ELECTROMAGNETIC CLUTCH FOR AUTOMOBILES

BACKGROUND OF THE INVENTION

The present invention relates to an electromagnetic clutch control for vehicles, and more particularly to an electromagnetic control system which is capable of eliminating residual magnetism in the electromagnetic clutch by inverted clutch current passing a magnetizing coil, when change-gear in the transmission is in a neutral position and engine is not accelerated.

An electromagnetic clutch comprises an annular drive member secured to the crankshaft of an engine, a magnetizing coil provided in the drive member, a driven member secured to the input shaft of the transmission spaced by a small gap from the drive member, and a shift lever for changing the gear in the transmission. The shift lever is provided with a switch in the grip for the magnetizing coil, which is opened by operating pressure caused by manual operation of the shift lever, such as gripping pressure, pushing or pulling pressure. While the shift lever is being operated and operating pressure is exerted on the grip, the switch is opened with the result that the current does not flow through the magnetizing coil and the clutch is disengaged. When the shift lever reaches a gear engaging position and the operating pressure is removed, the switch is closed so that electric current flows through the magnetizing coil to magnetize the drive member. As the accelerator pedal is depressed, the current passing through the coil increases. The magnetic flux is aggregated in the gap between the drive member and the driven member, so that the driven member becomes coupled to the drive member. The clutch current passing the magnetizing coil is progressively increased according to the degree of depression of the accelerator pedal, while the clutch slips between the drive member and the driven member. Thus, the car may be smoothly and easily started by depressing the accelerator pedal without operating the clutch pedal. This is a well-known technique. In such an electromagnetic clutch, a so-called double clutch action is effected to thereby provide a smooth engagement between gears. Double-clutching is caused by the fact that when the operating pressure disappears at the neutral position during shifting operation of the shift lever, the shift lever switch is closed to engage the clutch.

In such a system, when the shift lever is shifted from one change speed position to another change speed position passing through the neutral position, the magnetism is able to remain in the clutch after cutting off of the clutch current because of magnetizing at the netural position. The shift lever must be operated against the drag torque caused by such residual magnetism, which requires a great manual operating force. This tendency increases when the engine speed is increased by depressing the accelerator pedal during idling of the engine at the start of the vehicle. In a transmission without a synchronizing mechanism, when gear-change is performed suddenly, the gears do not smoothly mesh each other, because it takes a long time for the gears to become synchronized.

SUMMARY OF THE INVENTION

In order to overcome such defects, the present invention provides a system for electro-magnetic clutches, which is adapted to pass inverted clutch current to the clutch coil to eliminate the residual magnetism produced by hysteresis of the clutch body to achieve a smooth synchronization when the transmission is in neutral position and the engine is not accelerated.

According to the present invention, there is provided a system for controlling an electro-magnetic clutch of an internal combustion engine mounted on a vehicle, which has a drive member secured to a crankshaft of the internal combustion engine, a magnetizing coil provided in the drive member, a driven member adjacent to said drive member, a transmission secured to the driven member having a multi-stage change gears, and a shift lever for operating the transmission, comprising a first means responsive to the operation of the shift lever for providing an output signal having one of logic levels at the neutral position of the shift lever; a second means responsive to the acceleration of the engine for providing an output signal having one of logic levels when the engine is not accelerated; control circuit means responsive to the output signals of the first and second means for providing an output signal having one of logic levels; and switch circuit means responsive to the output signal of the control circuit means for controlling the current flowing through the magnetizing coil; the switch circuit means being so arranged that the current flows through the magnetizing coil in the inverted polarity according to output signal having one of logic levels from the control circuit means under the condition of the output signals from the first and second means and that the exciting current flows through the magnetizing coil according to the other logic level of the output signal from the control circuit.

DETAILED DESCRIPTION OF THE PREFERRED EMBODIMENTS

Figure 1:
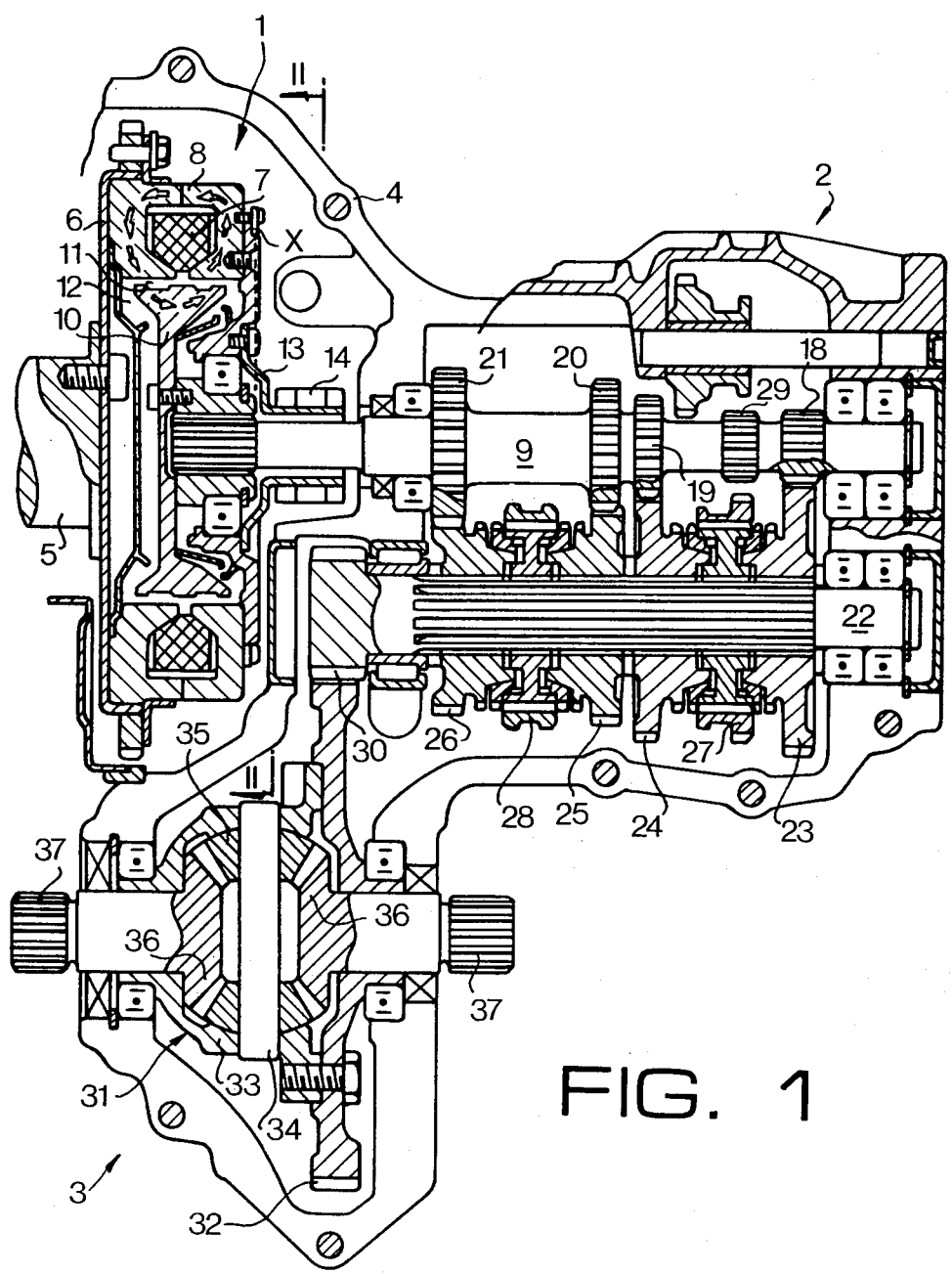
FIG. 1 is a sectional view of a transmission with an electromagnetic clutch used in a system according to the present invention.
Figure 2:
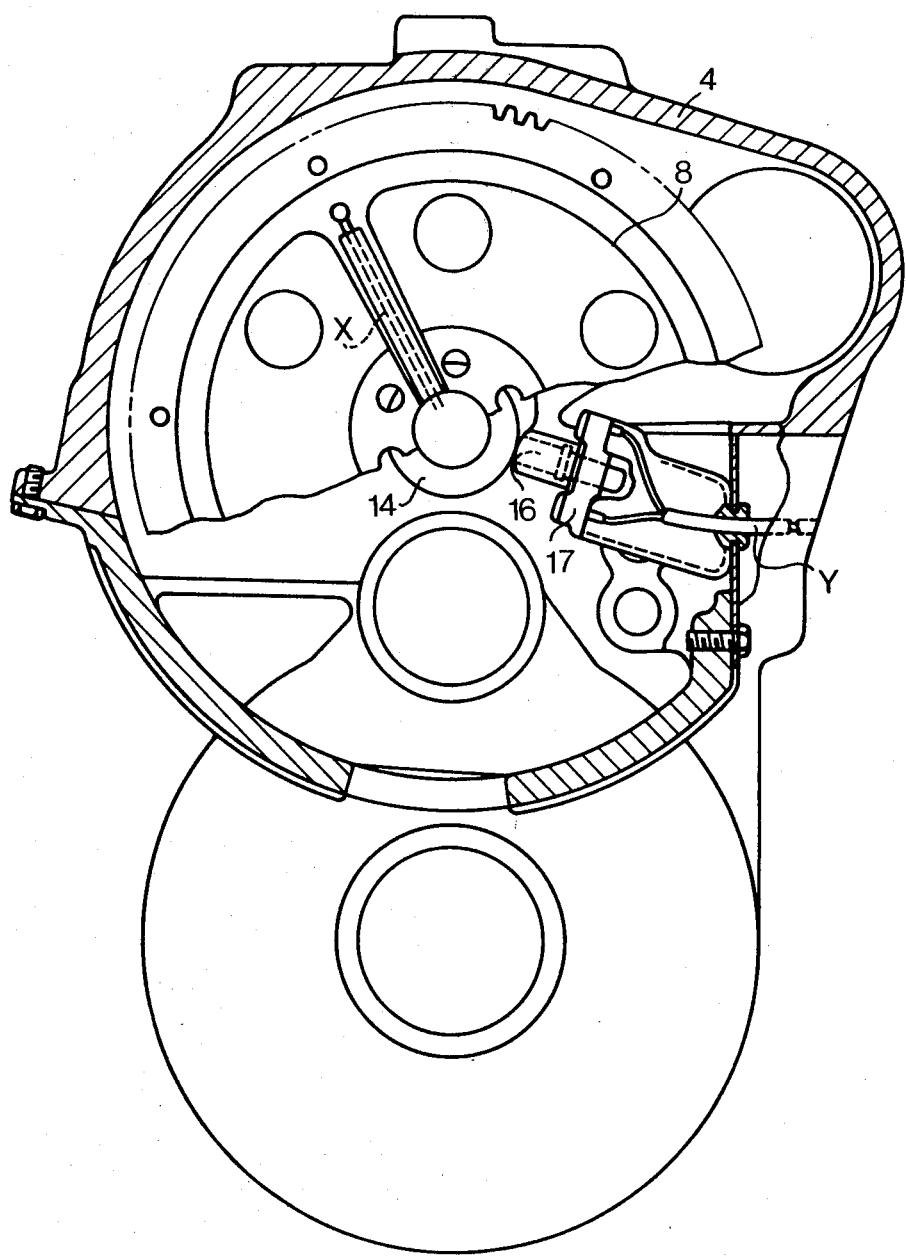
FIG. 2 is a sectional view taken along the line II—II in FIG. 1.

Referring to FIGS. 1 and 2 showing a transmission to which the present invention is applied, an electromagnetic powder clutch 1 is operatively connected to a four-speed transmission 2 which in turn is operatively connected to a final reduction device 3.

The electromagnetic powder clutch 1 is provided in a clutch case 4 and comprises a drive plate 6 attached to the end of a crankshaft 5 of an internal combustion engine (not shown), an annular drive member 8 secured to the drive plate 6, a magnetizing coil 7 provided in the drive member 8, and a driven member 10 secured by a spline engagement to an input shaft 9 of the transmission 2, spaced leaving an annular gap 11 from the drive member 8. Magnetic powder is provided in a powder chamber 12 and the gap 11 is adapted to be filled with the powder. A cap 13 is secured to the drive member 8. The cap 13 has a cylindrical portion coaxial with the input shaft 9, to which slip rings 14 are secured. The slip rings 14 are connected to the drive member 8 by a lead X. Brushes 16 (FIG. 2) press against the slip rings 14 and are supported in a holder 17 and connected to a hereinafter described control means by a lead Y.

In such a construction, the drive plate 6 and the drive member 8 rotate together with the crankshaft 5 and the magnetic powder which has been sealed in the powder chamber 12 is drawn to the inner surface of the drive member 8 by centrifugal force. If the magnetizing coil 7 is excited by the current passing through the lead Y, the brushes 16, the slip rings 14 and the lead X, the drive member 8 is magnetized to produce a magnetic flux passing through the driven member 10 as shown by arrows in FIG. 1. Thus, the powder aggregates in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, respectively. Driven gears 23 to 26 are rotatably mounted on the output shaft 22 parallel to the input shaft 9. Each of the driven gears 23 and 24 is adapted to be engaged with the output shaft 22 by operating a synchromesh mechanism 27 and each of the driven gears 25 and 26 is engageable with the output shaft 22 by a synchromesh mechanism 28 in a well-known manner. Further, a reverse drive gear means 29 is provided. Thus, by operating a shift lever S (FIG. 3) of the transmission, the driven gear 23 is coupled integrally with the output shaft 22 by the synchromesh mechanism 27 and the 1st speed is obtained on the output shaft 22 because the power of output shaft 9 is greatly decreased. The 2nd, 3rd and 4th speed may be respectively obtained accordingly.

Moreover, provided on an end of the output shaft 22 is an output gear 30 which engages with a ring gear 32 in a differential 31 of the final reduction device 3 to transmit the output of the output shaft 22 of the transmission 2 directly from the ring gear 32 to a side gear 36 through a case 33, a spider 34 and a pinion 35, and further to driving wheels of a vehicle through a wheel shaft 37.

Figure 3:
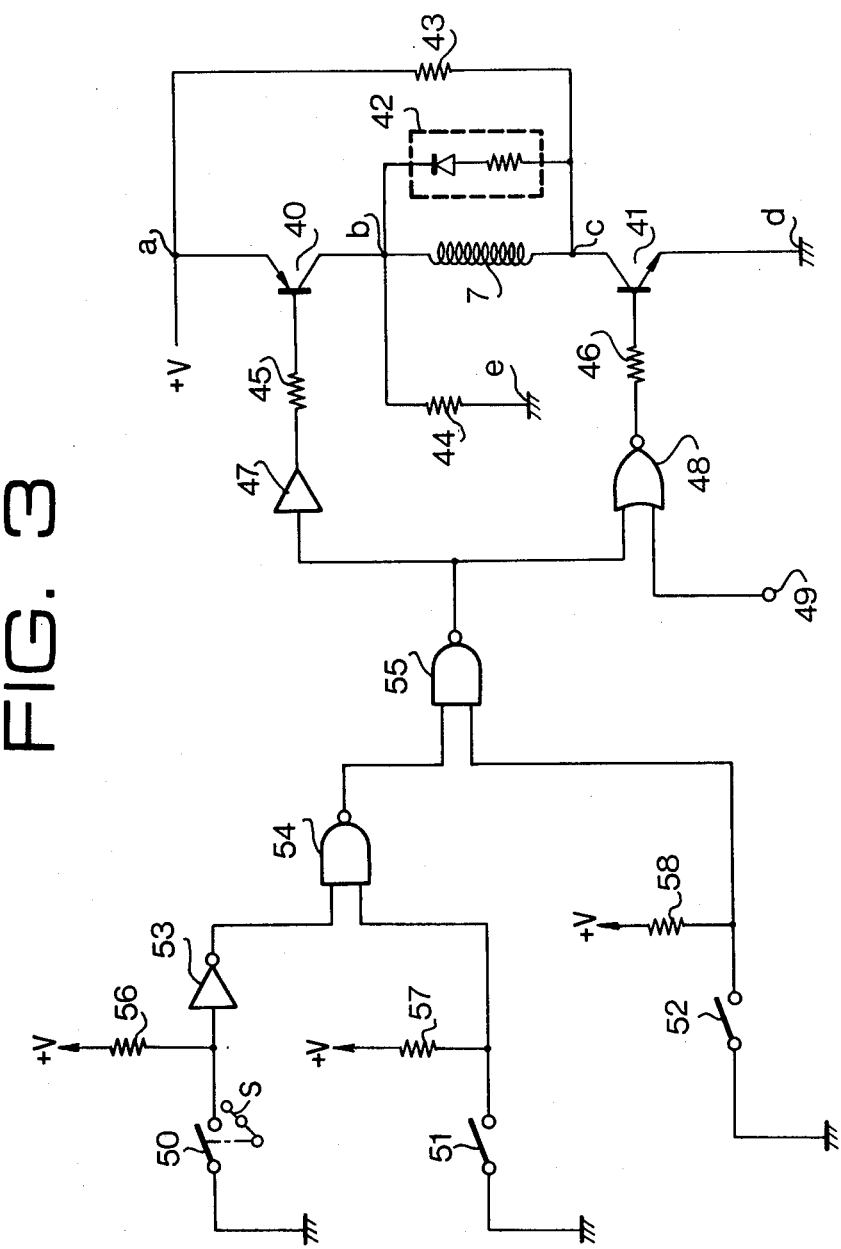
FIG. 3 is a circuit showing an example of the system of the present invention.

FIG. 3 shows an arrangement of the control circuit, in which a transistor 40 of a PNP type and a transistor 41 of an NPN type are connected in series to opposite ends of the magnetizing coil 7. An emitter of the transistor 40 is connected to an electric source, while an emitter of the transistor 41 is grounded. A commutation circuit 42 comprising a diode and a resistor and is connected to both ends b, c of the coil 7. A resistor 43 for inverted current is connected to the electric source and the collector of the transistor 41, and a resistor 44 for inverted current is connected between the collector of the transistor 40 and the ground. The bases of the transistors 40, 41 are connected to resistors 45, 46, respectively. The resistor 45 is connected to a NAND gate 55 through a buffer 47 and the resistor 46 is connected to the NAND gate 55 through a NOR gate 48. On the other hand, clutch control signal is applied to another input 49 of the NOR gate 48. The input 49 is at a high level S during operation of the shift lever.

A neutral switch 50 is on when the shift lever is in the neutral position, a clutch hold switch 51 is on when the engine is accelerated and which is actuated by the accelerator pedal, and a shift lever switch 52 provided on the shift lever, is on during operation of the shift lever. One end of each switch 50, 51 and 52 is connected to the ground, while the other end of the neutral switch 50 is connected to a NAND gate 54 through an inverter 53, the other end of the clutch hold switch 51 to the NAND gate 54, and the other end of the shift lever switch 52 is connected to one input of the NAND gate 55. The output of the NAND gate 54 is also connected to another input of the NAND gate 55. Positive electric potential is applied to the other ends of switches 50, 51 and 52 through resistors 56, 57 and 58, respectively. The output of the NAND gate 55 is connected to the buffer 47 and NOR gate 48.

Figure 4:
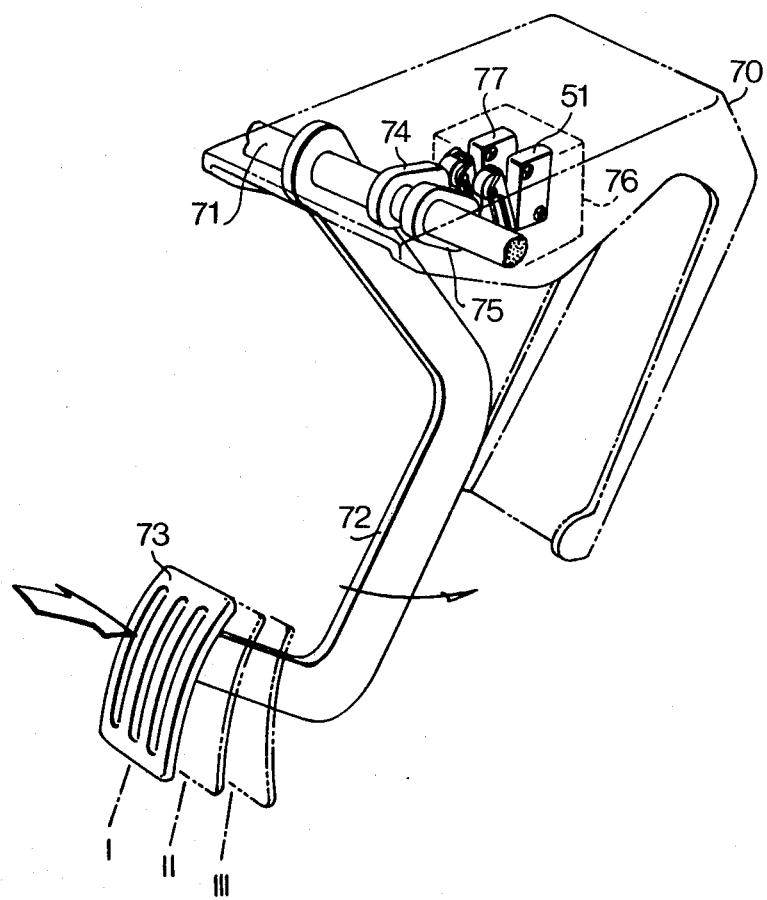
FIG. 4 is a perspective view showing an accelerator pedal.

As shown in FIG. 4, the accelerator mechanism comprises a bracket 70 made of a metal sheet which is fixed to the car body, a shaft 71 rotatably supported on the bracket 70, a U-shaped arm 72 fixed to the shaft 71, and an accelerator pedal 73 mounted on the end of the arm 72. Further, a pair of cams 74, 75 spaced apart from each other are secured to the shaft 71 to face respectively an accelerator switch 77 and the clutch hold switch 51 provided in a supporting box 76.

The arm 72 is always biased in the clockwise direction by a spring (not shown) and is moved in the counter-clockwise direction by depressing the accelerator pedal 73. In FIG. 4, reference numeral I indicates a stationary position when the accelerator pedal 73 is not depressed. When the accelerator pedal 73 is depressed to II position, the cam 74 engages the accelerator switch 77 to turn it on. When the accelerator pedal is depressed $\frac{1}{4}$ to $\frac{1}{3}$ of the entire stroke III, the cam 75 engages with the clutch hold switch 51 to turn it on.

The operation of the embodiment of the present invention will be explained as follows.

When the accelerator pedal 73 is not depressed and the shift lever is kept in the neutral position or when the shift lever is moved to the gear engaging position This occurs because the clutch hold switch 51 is turned off, the NAND gate 54 is applied with a high level signal. Therefore, the NAND gate 54 produces a high or low level signal depending on whether the neutral switch 50 is off or on. When the shift lever is operated, the shift lever switch 52 is turned on, so that a low level signal is applied to the NAND gate 55. Thus, the NAND gate 55 produces a high level output irrespective of the output level of the NAND gate 54. The output of the NOR gate 48 produces a low level output irrespective of the input 49. Therefore, the high level turns off the transistors 40, 41 to send the current in the order of a→c→b→e, so that inverted clutch current flows through the magnetizing coil 7. Thus, the residual magnetism in the clutch can be removed. Therefore, no drag of the driven member 10 is effected by the drive member 8, thus, hastening synchronization for smooth engagement of the gears.

Figure 5:
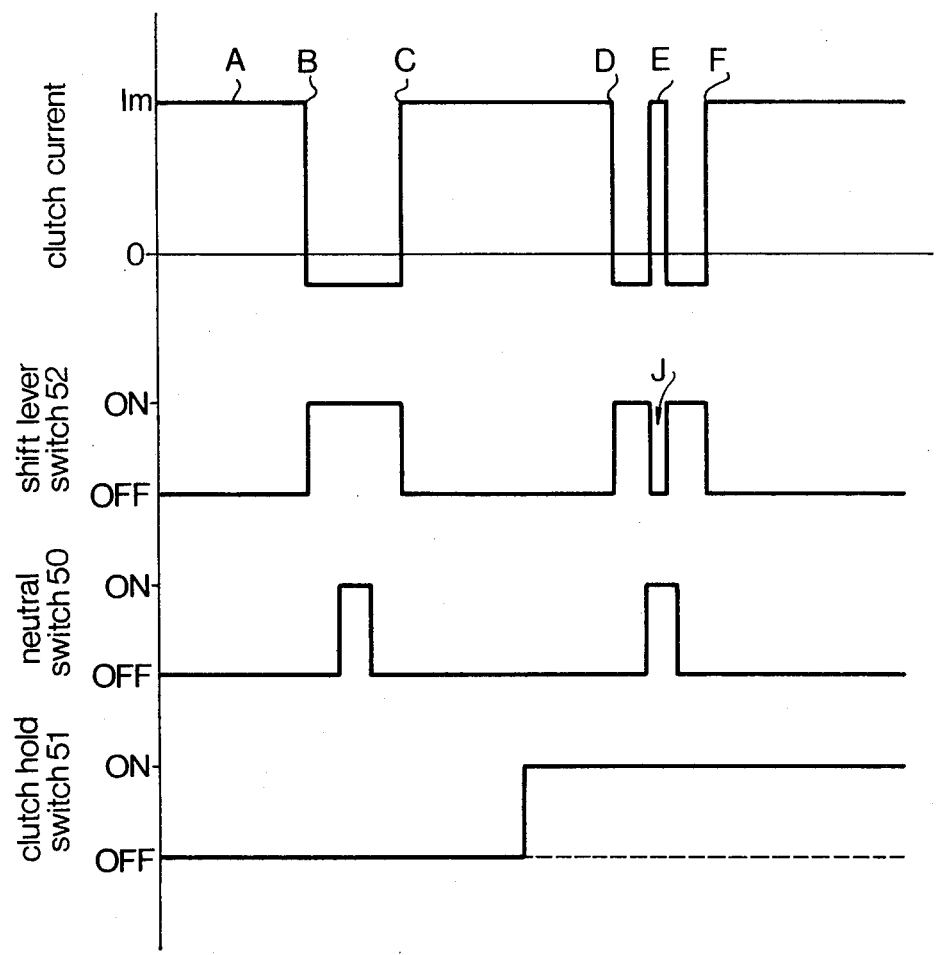
FIG. 5 is a graph showing the relationship between the clutch current and signals.

FIG. 5 is a graph showing the relationship between the clutch current and the operation of the shift lever. While the shift lever is not operated, rated clutch current Im flows as indicated by A, which means that the clutch is engaged. When the shift lever switch 52 is turned on, the inverted clutch current flows temporarily as shown by B. When the shift lever switch 52 is turned off at the end of the shift lever operation, the rated current Im starts to flow again as show by C to engage the clutch.

When the accelerator pedal is depressed and the shift lever is operated

The shift lever switch 52 is turned on, and the NAND gate 55 is applied with a low level signal and a high level output appears at the output. Therefore, the transistors 40, 41 are turned off, so that the electric current flows in the order of a→c→b→e as shown in FIG. 3. Thus, the inverted current passes through coil 7 during the operation of the shift lever. On the other hand, the clutch hold switch 51 is turned on, because the accelerator pedal 73 is depressed. Accordingly, the NAND gate 54 is applied with a low level signal, so that the output is at a high level. Therefore, when the shift lever switch 52 is turned off temporarily while in neutral position, the output of NAND gate 55 goes to a low level, causing the transistors 40,41 to turn on. Thus, the clutch is engaged, effecting the double-clutch action.

The double-clutch operation is illustrated in FIG. 5. When the shift lever switch 52 is turned on at point D, the inverted clutch current passes through the coil 7. The inverted clutch current continues as long as the shift lever switch 52 is on. When the shift lever switch 52 is turned off at point J while the neutral switch 50 is on, the normal clutch current as shown by E flows for the double clutching as long as the shift lever switch 52 is off. Further, when both the neutral switch 50 and the shift lever switch 52 are turned off at the end of the operation of the shift lever, the rated curent Im flows as indicated by F, so that the electromagnetic powder clutch 1 is engaged.

When the accelerator pedal 73 is depressed during the neutral position of the shift lever:

Since the clutch hold switch 51 is on because of the depression of the accelerator pedal 73, the NAND gate 54 is applied with a low level signal. Therefore, the output of the NAND gate 54 is high regardless of whether neutral switch 50 is on or off. Since the shift lever is not operated, the shift lever switch 52 is off, and hence the NAND gate 55 is applied with a high level signal. Thus, the output of the NAND gate 55 is at a low level. The low level signal from the NAND gate 55 is fed to the transistor 40 through the buffer 47 to turn it on. Further, since both inputs of the NOR gate 48 are low, the output thereof is at a high level, which causes the transistor 41 to turn on. Thus, the electric current is caused to flow in the order of a→b→c→d through the magnetizing coil 7.

In the illustrated embodiment, the acceleration of the engine is detected by the degree of depression of the accelerator pedal. However, it will be understood that the present invention is not limited thereto, but that the same effects can be obtained by, for example, a negative pressure sensor provided in an intake passage of the carburetor of the engine.

In accordance with the above-described construction of the present invention, since the inverted current flows through the magnetizing coil when the shift lever of the transmission is in the neutral position, the residual magnetism can be immediately eliminated. Thus, the shift lever can be lightly and smoothly operated for changing gears.

What is claimed is:

1. In a system for controlling an electro-magnetic clutch of an internal combustion engine mounted on a vehicle which has an accelerator pedal, a drive member secured to a crankshaft of said internal combustion engine, a driven member adjacent said drive member, a transmission secured to said driven member and having multi-stage change gears and a shift lever therefor, a magnetizing coil provided in one of said members, and an electric circuit means including said magnetizing coil which is capable of passing excitation current through said magnetizing coil in a normal direction, the improvement comprising shift lever switch means for producing an output signal having one logic level during a shifting operation of the shift lever of said transmission, a neutral switch means for producing an output signal having one logic level in a neutral position of the shift lever, a clutch hold switch means for producing an output signal having one logic level when said accelerator pedal is depressed, logic circuit means responsive to said output signals of said shift lever switch means, said clutch hold switch means and said neutral switch means for providing an output signal having logic levels, said electric circuit means being responsive to said output signal of said logic circuit means for controlling the current flowing through said magnetizing coil, and said electric circuit means being so arranged that the current flows through said magnetizing coil with inverted polarity when the output signal from said logic circuit means has one logic level in the neutral position of said shift lever and that the excitation current flows through said magnetizing coil in said normal direction when the output signal of said logic circuit means has another logic level when said accelerator pedal is depressed in the neutral position of said shift lever for causing a double clutch operation.

2. The system for controlling an electro-magnetic clutch of an internal combustion engine according to claim 1, wherein said electric circuit means being so arranged that the excitation current flows through said magnetizing coil in said normal direction when the output signal of said logic circuit means has said another logic level in response to opening of said shift lever switch means in an engaged condition of the change gears respectively, and respectively closing of the neutral switch means when said accelerator pedal is depressed in the neutral position of said shift lever for causing the double clutch operation.

3. The system for controlling an electro-magnetic clutch of an internal combustion engine according to claim 2, wherein said clutch hold switch means is for producing another output signal with another logic level when said accelerator pedal is not depressed, said electric circuit means is so arranged that the current flows through said coil with the inverted polarity when said another output signal of said clutch hold switch means occurs and said shift lever is in said neutral position, and respectively during the shifting operation of said shift lever.

4. The system for controlling an electro-magnetic clutch of an internal combustion engine according to claim 1, wherein said electric circuit means includes a pair of transistors with collector-emitter paths in series with said magnetizing coil therebetween.

5. The system for controlling an electro-magnetic clutch of an internal combustion engine according to claim 3, wherein said logic electric circuit means comprises a first NAND gate having a first input operatively connected to said neutral switch means and another input connected to said shift lever switch means.

6. The system for controlling an electro-magnetic clutch of an internal combustion engine according to claim 5, wherein
said logic circuit means further comprises a second NAND gate having an input connected to said neutral switch means, an output connected to said first input of said first NAND gate, and another input connected to said clutch hold switch means.

7. The system for controlling an electro-magnetic clutch of an internal combustion engine according to claim 6, further wherein
said logic circuit means further comprises a NOR gate having an input connected to the output of said first NAND gate and another input receiving a clutch control signal having one logic level when the shift lever is moving.

8. The system for controlling an electro-magnetic clutch of an internal combustion engine according to claim 6, further wherein
said electric circuit means includes a pair of transistors with collector-emitter paths in series with said magnetizing coil therebetween,
one of said transistors is a NPN transistor and the other of said transistors is a PNP transistor,
a base of one of said transistors is connected to the output of said NOR gate and a base of another of said transistors is connected to the output of said first NAND gate.

9. The system for controlling an electro-magnetic clutch of an internal combustion engine according to claim 8, further wherein
said electric circuit means further comprises a commutation circuit having a first resistor and a diode in series and together connected in parallel to said magnetizing coil,
a second resistor is connected at one end to a junction of said commutation circuit and one end of said magnetizing coil,
a third resistor is connected at one end thereof to another end of said magnetizing coil, said one ends of said second and third resistors and said collector-emitter paths of said transistors are connected across voltage.

10. The system for controlling an electro-magnetic clutch of an internal combustion engine according to claim 1, wherein
said electro-magnetic clutch is a powder clutch.

11. The system for controlling an electro-magnetic clutch of an internal combustion engine according to claim 1, wherein
said accelerator pedal is depressed means said accelerator pedal is depressed at least to a certain extent.

12. The system for controlling an electro-magnetic clutch of an internal combustion engine according to claim 2, wherein
said accelerator pedal is depressed means said accelerator pedal is depressed at least to a certain extent.

13. The system for controlling an electro-magnetic clutch of an internal combustion engine according to claim 3, wherein
said accelerator pedal is depressed means said accelerator pedal is depressed at least to a certain extent,
said accelerator pedal is not depressed means said accelerator pedal is not depressed to at least said certain extent.

* * * * *